United States Patent
Bang (10) Patent No.: US 11,880,691 B2
(45) Date of Patent: Jan. 23, 2024

(54) INTERNET OF THINGS (IOT) DEVICE, IOT DEVICE MANAGEMENT SYSTEM, AND METHOD FOR MANAGING IOT DEVICE

(71) Applicant: UNIONPLACE CO., LTD., Seoul (KR)

(72) Inventor: Seongcheol Bang, Seoul (KR)

(73) Assignee: UNIONPLACE CO., LTD., Seoul (KR)

(*) Notice: Subject to any disclaimer, the term of this patent is extended or adjusted under 35 U.S.C. 154(b) by 64 days.

(21) Appl. No.: 17/879,669

(22) Filed: Aug. 2, 2022

(65) Prior Publication Data

US 2022/0374243 A1     Nov. 24, 2022

Related U.S. Application Data

(63) Continuation of application No. PCT/KR2021/009266, filed on Jul. 19, 2021.

(30) Foreign Application Priority Data

Dec. 22, 2020 (KR) .................. 10-2020-0180624

(51) Int. Cl.
     *G06F 9/00*     (2006.01)
     *G06F 9/4401*    (2018.01)
     (Continued)

(52) U.S. Cl.
     CPC .............. *G06F 9/442* (2013.01); *G16Y 20/20* (2020.01); *G16Y 40/35* (2020.01)

(58) Field of Classification Search
     CPC .......... G06F 9/442; G06F 8/654; G06F 21/53; G06F 21/57; G16Y 20/20; G16Y 40/35; G16Y 30/10
See application file for complete search history.

(56) References Cited

U.S. PATENT DOCUMENTS

| | | | | |
|---|---|---|---|---|
| 2018/0145948 | A1* | 5/2018 | Kim | H04L 63/0236 |
| 2019/0163910 | A1* | 5/2019 | Moon | G06F 21/54 |
| 2020/0288210 | A1* | 9/2020 | Yang | H04N 21/4435 |

FOREIGN PATENT DOCUMENTS

| KR | 10-2016-0133615 | 11/2016 |
|---|---|---|
| KR | 10-2016-0134895 | 11/2016 |

(Continued)

OTHER PUBLICATIONS

International Search Report dated Oct. 18, 2021, issued to International Application No. PCT/KR2021/009266.

(Continued)

*Primary Examiner* — Nitin C Patel
(74) *Attorney, Agent, or Firm* — Stein IP, LLC (57) ABSTRACT

An Internet of Things (IoT) device includes a first memory disposed in a normal zone; a first driver disposed in the normal zone; and a second driver disposed in a secure zone. The first driver is configured to perform: (a) monitoring the first memory to generate data change information of the first memory, the data change information being information on changes of data in the first memory; (b) transmitting the data change information to the second driver; and (c) controlling an operating state of the IoT device based on an instruction for the operating state received from the second driver. The second driver is configured to perform: (d) transmitting the data change information to a specified IoT device management system; and (e) receiving the instruction for the operating state from the IoT device management system and transmitting the instruction for the operating state to the first driver.

18 Claims, 8 Drawing Sheets

(51) Int. Cl.
*G16Y 20/20* (2020.01)
*G16Y 40/35* (2020.01)

(56) References Cited

FOREIGN PATENT DOCUMENTS

| KR | 10-2017-0012957 | 2/2017 |
| KR | 10-2017-0089352 | 8/2017 |
| KR | 10-2017-0142672 | 12/2017 |
| KR | 10-2019-0033411 | 3/2019 |
| KR | 10-2019-0063264 | 6/2019 |
| KR | 10-2020-0073411 | 6/2020 |
| KR | 10-2020-0073413 | 6/2020 |
| KR | 10-2236761 | 4/2021 |

OTHER PUBLICATIONS

Korean Office Action dated Apr. 8, 2021, issued to Korean Application No. 10-2020-0180624.

\* cited by examiner

INTERNET OF THINGS (IOT) DEVICE, IOT DEVICE MANAGEMENT SYSTEM, AND METHOD FOR MANAGING IOT DEVICE

CROSS-REFERENCE TO RELATED PATENT APPLICATION

This application is a bypass continuation of International Application No. PCT/KR2021/009266, filed on Jul. 19, 2021, in the WIPO, and Korean Patent Application No. 10-2020-0180624, filed on Dec. 22, 2020, in the Korean Intellectual Property Office, the entire contents of which are hereby incorporated by reference.

BACKGROUND

1. Field

The present disclosure relates to an Internet of Things (IoT) device, an IoT device management system, and a method for managing the IoT device.

This work was supported by Institute of Information & Communications Technology Planning & Evaluation (IITP) grant funded by the Ministry of Science and ICT (MSIT) of Republic of Korea (Research Project Title: "LTE-R 5G integrated-control container on Next generation Railway communication", NIST No.: 1711152609).

2. Description of the Related Art

The Internet of Things (IoT) refers to a technology of connecting physical objects (things) with, for example, a computing function and a communications function to the Internet. With the IoT technology, not only devices such as computers and mobile communication terminals, but also various types of devices such as home appliances, wearable devices, and sensors may be connected to a network such as the Internet. In the present specification, a device to which the IoT technology is applied is referred to as an Internet of Things device (hereinafter, also simply referred to as "IoT device").

The IoT device may be implemented by using, for example, a semiconductor device such as a processor having a secure zone and a normal zone. The secure zone may also be referred to as a trust zone. The IoT device may be generally implemented by using a semiconductor device such as a low specification processor, especially for the purpose of the cost reduction.

For example, Korean Patent Application Publication No. 10-2017-0012957 entitled "Security network system and data processing method therefor," filed by Samsung Electronics Co., Ltd. and published on Feb. 6, 2017, discloses a technique of using a processor selectively operable in either a secure world (secure zone) or a normal world (normal zone).

Meanwhile, the IoT device may be exposed to malicious attacks such as hacking attacks since the IoT device is connected to a network such as the Internet. In general, the IoT device has a low computing power. Thus, the IoT device may not be effectively protected against the malicious attacks. Further, even when the IoT device is used as a hacking path due to a malicious attack, for example, the IoT device may not recognize the fact that it is used as the hacking path itself. Therefore, the IoT device may not be able to effectively respond to the malicious attack.

For example, Korean Patent Application Publication No. 10-2016-0134895 entitled "Secure communication device in Internet of Things environment and method thereof," filed by FutureSystems, Inc. and published on Nov. 24, 2016, discloses a technique of using a virtual device obtained by virtualizing an IoT device in order to enhance the security of the IoT device.

The virtual device disclosed in Korean Patent Application Publication No. 10-2016-0134895 shares a pre-shared key (PSK) with the IoT device. The virtual device executes an authentication operation of another IoT device that is a communication target of the IoT device and generates a secure key block including an encryption key for transmitting and receiving data between the IoT device and another IoT device. The IoT device executes the decryption of the secure key block by using the PSK, and data is transmitted and received between the IoT device and another IoT device by using the secure key block.

Although the virtual device disclosed in Korean Patent Application Publication No. 10-2016-0134895 executes the authentication operation for other IoT devices and enhances the security of the IoT device by using the PSK and the secure key block, the IoT device cannot effectively respond to a malicious attack when it is exposed to the malicious attack.

RELATED ART DOCUMENT

Patent Document

Patent Document 1: Korean Patent Application Publication No. 10-2017-0012957
Patent Document 2: Korean Patent Application Publication No. 10-2016-0134895

SUMMARY

In view of the above, the present disclosure provides an Internet of Things (IoT) device capable of effectively responding to malicious attacks, and also provides an IoT device management system capable of managing an operation of the IoT device by analyzing the malicious attacks on the IoT device and a method for managing the IoT device.

In accordance with an embodiment of the present disclosure, there is provided an Internet of Things (IoT) device including: a first memory disposed in a normal zone; a first driver disposed in the normal zone; and a second driver disposed in a secure zone. The first driver is configured to perform: (a) monitoring the first memory to generate data change information of the first memory, the data change information being information on changes of data in the first memory; (b) transmitting the data change information to the second driver; and (c) controlling an operating state of the IoT device based on an instruction for the operating state received from the second driver. The second driver is configured to perform: (d) transmitting the data change information to a specified IoT device management system; and (e) receiving the instruction for the operating state from the IoT device management system and transmitting the instruction for the operating state to the first driver.

In accordance with the technique described in the present disclosure, it is possible to provide an Internet of Things (IoT) device capable of effectively responding to malicious attacks, and also to provide an IoT device management system capable of managing an operation of the IoT device by analyzing the malicious attacks on the IoT device and a method for managing the IoT device.

In accordance with the technique described in the present disclosure, for example, even when the IoT device is implemented by using a semiconductor device such as a low specification processor, the effective response to the malicious attacks can be made by controlling an operating state of the IoT device based on an instruction for an operating state transmitted from the IoT device management system.

In accordance with the technique described in the present disclosure, for example, the IoT device management system having high computing power determines whether a virtual device of the IoT device operates normally to thereby generate an instruction for an operating state. Therefore, the effective response to the malicious attacks can be made.

DETAILED DESCRIPTION

Hereinafter, embodiments of an Internet of Things (IoT) device, an IoT device management system, and a method for managing the IoT device according to a technique described the present disclosure will be described in detail with reference to the accompanying drawings. Meanwhile, for the sake of convenience of description, in the drawings for describing the embodiments of the technique of the present disclosure, only a part of the practical configurations may be illustrated or the practical configurations may be illustrated while a part of the practical configurations is omitted or changed. Further, relative dimensions and proportions of parts therein may be exaggerated or reduced in size.

First Embodiment

A first embodiment of the present disclosure will be described with reference to the accompanying drawings.

Figure 1:
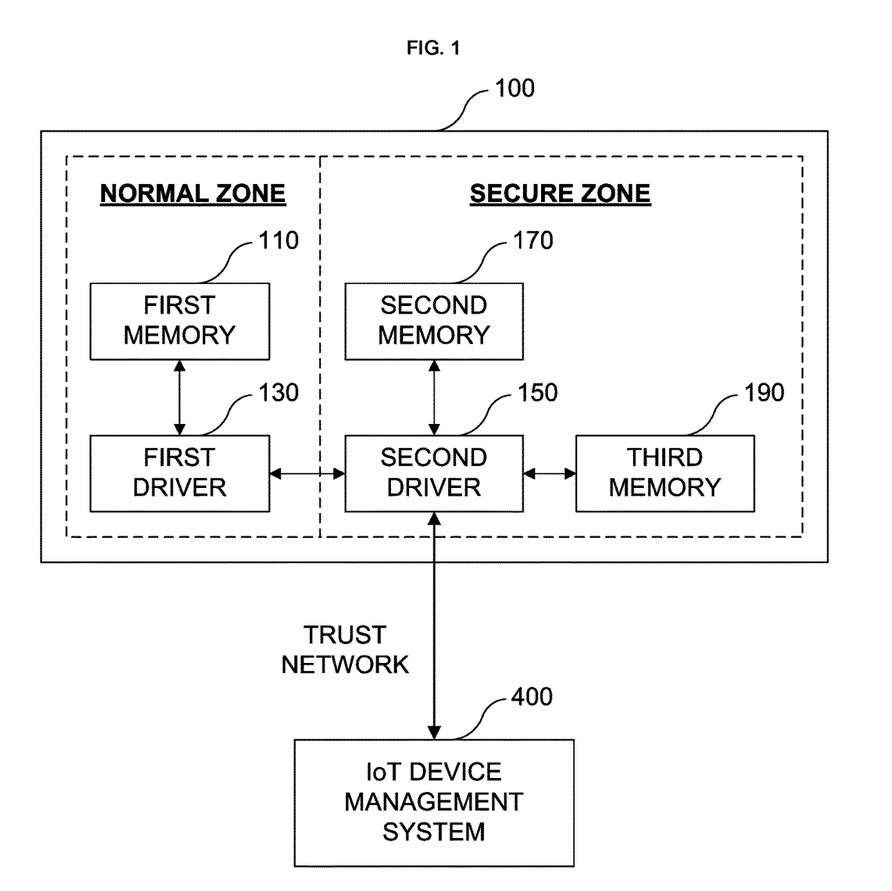
FIG. 1 is a diagram illustrating an exemplary configuration of an Internet of Things (IoT) device according to a first embodiment of the technique described in the present disclosure.

FIG. 1 is a diagram illustrating an exemplary configuration of an IoT device according to the first embodiment of the technique described in the present disclosure.

An Internet of Things (IoT) device 100 according to the technique described in the present disclosure may be implemented using semiconductor devices, for example, ARM-based semiconductor devices, each having a normal zone and a secure zone. The IoT device 100 may include, for example, but not limited to, a sensor having a computing function and a communication function.

Referring to FIG. 1, the IoT device 100 includes a first memory 110 disposed in the normal zone, a first driver 130 disposed in the normal zone, and a second driver 150 disposed in the secure zone. The IoT device 100 may further include at least one of a second memory 170 disposed in the secure zone and a third memory 190 disposed in the secure zone.

The first memory 110, the second memory 170, and the third memory 190 may be implemented using memories embedded in the semiconductor device.

The first driver 130 and the second driver 150 may be implemented using elements such as processors disposed in the semiconductor device. The first driver 130 and the second driver 150 may operate on, for example, an operating system (or a secure operating system).

The first memory 110 is configured to store data related to the operation of the IoT device 100. The data related to the operation of the IoT device 100 may include, for example, identification information of the IoT device 100, device setting information, applications running on the IoT device 100 and data related to the applications. For example, data related to the operation of the IoT device 100 stored in the first memory 110 may be changed when an application is executed on the IoT device 100. Specifically, data related to the operation of the IoT device 100 stored in the first memory 110 may be changed when the IoT device 100 operates normally. Data related to the operation of the IoT device 100 stored in the first memory 110 may also be changed when the IoT device 100 operates abnormally due to a malicious attack such as a hacking attack. In addition, for example, if the device setting information of the IoT device 100 is changed because the IoT device 100 operates abnormally, data related to the operation of the IoT device 100 stored in the first memory 110 may be changed. When data related to the operation of the IoT device 100 stored in the first memory 110 is changed, the first driver 130 generates data change information of the first memory 110 which will be discussed later in detail. Here, the data change information is information on changes of data in the first memory 110.

The second memory 170 is configured to store the data change information of the first memory 110. As will be discussed later, the second driver 150 may store the data change information of the first memory 110 in the second memory 170. Further, the second driver 150 may read the data change information from the second memory 170 and transmit the data change information read from the second memory 170 to an IoT device management system 400.

The third memory 190 is configured to store initial state data of the first memory 110. As will be discussed later, the initial state data of the first memory 110 stored in the third memory 190 may be used when the first driver 130 reboots and initializes the IoT device 100 according to a third instruction for an operating state through a process P130. In addition, as will be discussed later, the second driver 150 may transmit the initial state data of the first memory 110 stored in the third memory 190 through a predetermined management system for Internet of Things device (IoT device management system) 400 through a process P230.

Figure 2:
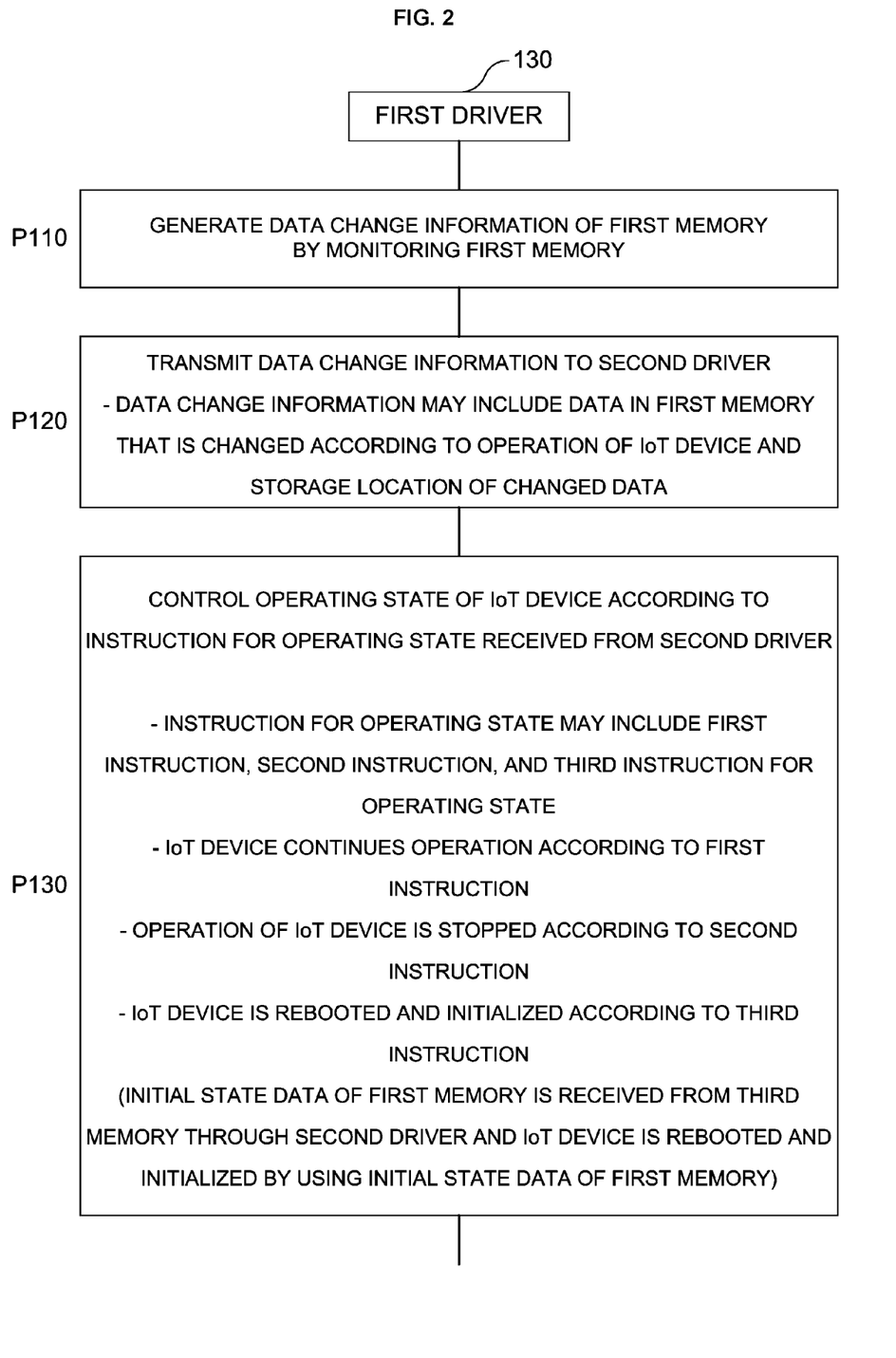
FIG. 2 is a diagram illustrating an example of processes performed by a first driver of the IoT device according to the first embodiment of the technique described in the present disclosure.

FIG. 2 is a diagram illustrating an example of processes performed by the first driver of the IoT device according to the first embodiment of the technique described in the present disclosure.

Referring to FIG. 2, the first driver 130 monitors the first memory 110 and generates data change information of the first memory 110 (process P110).

Specifically, the first driver 130 monitors the first memory 110 and generates the data change information of the first memory 110, which is information on data in the first memory 110 that is changed when the IoT device 100 operates normally or the IoT device 100 operates abnormally due to a malicious attack such as a hacking attack. The data change information may include data in the first memory 110 that is changed according to the operation (including both a normal operation and an abnormal operation) of the IoT device 100 and a storage location of the changed data.

Next, the first driver 130 transmits the data change information generated through the process P110 to the second driver 150 (process P120).

Specifically, the first driver 130 is configured to generate the data change information of the first memory 110. However, the first driver 130 is not configured to determine whether the IoT device 100 operates normally or abnormally based on the data change information of the first memory 110. In other words, in most cases, the computing power of the first driver 130 is not sufficient to determine whether the IoT device 100 operates normally or abnormally. Therefore, the determination on whether the IoT device 100 operates normally or abnormally is not performed by the first driver 130.

Next, the first driver 130 controls an operating state of the IoT device 100 according to an instruction for an operating state that is received from the second driver 150 (process P130).

That is, the first driver 130 does not determine whether the IoT device 100 operates normally or abnormally, but is configured to control the operating state of the IoT device 100 according to the instruction for the operating state received from the second driver 150.

The instruction for the operating state may be generated in such a way that the IoT device management system 400 applies data change information to a virtual device of the IoT device 100, which is a virtualized device obtained by virtualizing the IoT device 100, and determines whether the virtual device operates normally.

In other words, the IoT device management system 400, which has the sufficient computing power to determine whether the IoT device 100 operates normally or abnormally, generates an instruction for the operating state. The IoT device management system 400 further transmits the instruction for the operating state to the second driver 150. The second driver 150 transmits the instruction for the operating state to the first driver 130, and the first driver 130 may control the operating state of the IoT device 100 according to the instruction for the operating state received from the second driver 150.

Accordingly, even when the IoT device 100 operates abnormally due to a malicious attack such as a hacking attack, the first driver 130 may control the operating state of the IoT device 100 according to the instruction for the operating state. Therefore, the IoT device 100 effectively responds to the malicious attack.

The instruction for the operating state may include a first instruction for the operating state that allows the IoT device 100 to continue its operation; a second instruction for the operating state that stops the operation of the IoT device 100; and a third instruction for the operating state that reboots and initializes the IoT device 100.

Therefore, the first driver 130 is configured to appropriately and efficiently control the operating state of the IoT device 100 based on the instruction for the operating state received from the second driver 150.

More specifically, referring to FIG. 2, the process P130 may include a process of continuing the operation of the IoT device 100 according to the first instruction for the operating state; a process of stopping the operation of the IoT device 100 according to the second instruction for the operating state; and a process of rebooting and initializing the IoT device 100 according to the third instruction for the operating state.

Further, referring to FIG. 2, the process of rebooting and initializing the IoT device 100 according to the third instruction for the operating state may include a process of receiving initial state data of the first memory 110 from the third memory 190 through the second driver 150, and a process of rebooting and initializing the IoT device 100 using the initial state data of the first memory 110.

Figure 3:
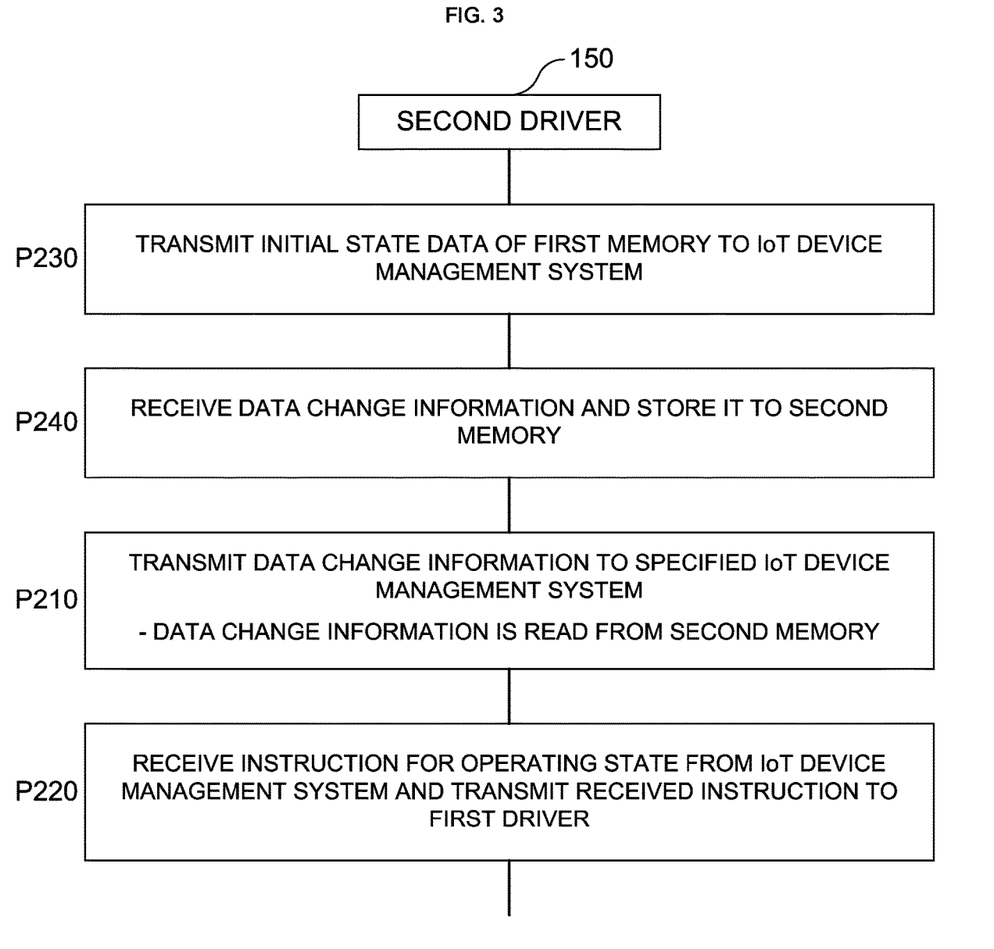
FIG. 3 is a diagram illustrating an example of processes performed by a second driver of the IoT device according to the first embodiment of the technique described in the present disclosure.

FIG. 3 is a diagram illustrating an example of processes performed by the second driver of the IoT device according to the first embodiment of the technique described in the present disclosure.

Referring to FIG. 3, the second driver 150 transmits data change information to the IoT device management system 400 (process P210).

Specifically, the second driver 150 is configured to receive the data change information of the first memory 110 from the first driver 130. However, the second driver 150 is not configured to determine whether the IoT device 100 operates normally or abnormally based on the data change information of the first memory 110. In other words, in most cases, the computing power of the second driver 150 is not sufficient to determine whether the IoT device 100 operates normally or abnormally. Therefore, the second driver 150 does not determine whether the IoT device 100 operates normally or abnormally and merely transmits the data change information to the IoT device management system 400.

Next, the second driver 150 receives an instruction for an operating state from the IoT device management system 400 and transmits the received instruction to the first driver 130 (process P220).

Since the second driver 150 is disposed in the secure zone, the second driver 150 does not directly control the operation of the first driver 130 that is disposed in the normal zone. Instead, the second driver 150 transmits an instruction for the operating state to the first driver 130.

Meanwhile, the second driver 150 may transmit the initial state data of the first memory 110 that is stored in the third memory 190 to the IoT device management system 400 (process P230).

That is, as will be discussed later, the second driver 150 transmits the initial state data of the first memory 110 to the IoT device management system 400 such that the IoT device management system 400 manages the virtual device of the IoT device 100. The IoT device management system 400 may create and maintain the virtual device based on the initial state data of the first memory 110.

Meanwhile, prior to the process P210, the second driver 150 may receive the data change information from the first driver 130 and store it into the second memory 170 (process P240). In the case where the data change information is stored in the second memory 170, the process P210 may further include a process of reading the data change information from the second memory 170. That is, after reading the data change information from the second memory 170, the second driver 150 may transmit the read data change information to the IoT device management system 400.

The second driver 150 may transmit data change information of the first memory 110 to the IoT device management system 400 through a trust network and receive an instruction for the operating state from the IoT device management system 400. The trust network is a secure and reliable network that can be used with a synchronous protocol such as a remote procedure call (RPC) protocol.

According to the first embodiment described above, the IoT device 100 transmits the data change information of the first memory 110 to the IoT device management system 400 and receives the instruction for the operating state from the IoT device management system 400.

Accordingly, even in the case where the IoT device 100 has insufficient computing power, the operating state of the IoT device 100 can be appropriately and efficiently controlled according to the instruction for the operating state. Accordingly, an effective response can be made against malicious attacks such as a hacking attack.

In addition, since the data change information of the first memory 110 is transmitted to the IoT device management system 400 by using the second driver 150 disposed in the secure zone, it is possible to minimize the influence on the operation of the IoT device 100, in particular, the operation of the first driver 130 disposed the normal zone.

Second Embodiment

Hereinafter, a second embodiment of the present disclosure will be described with reference to the accompanying drawings.

Figure 4:
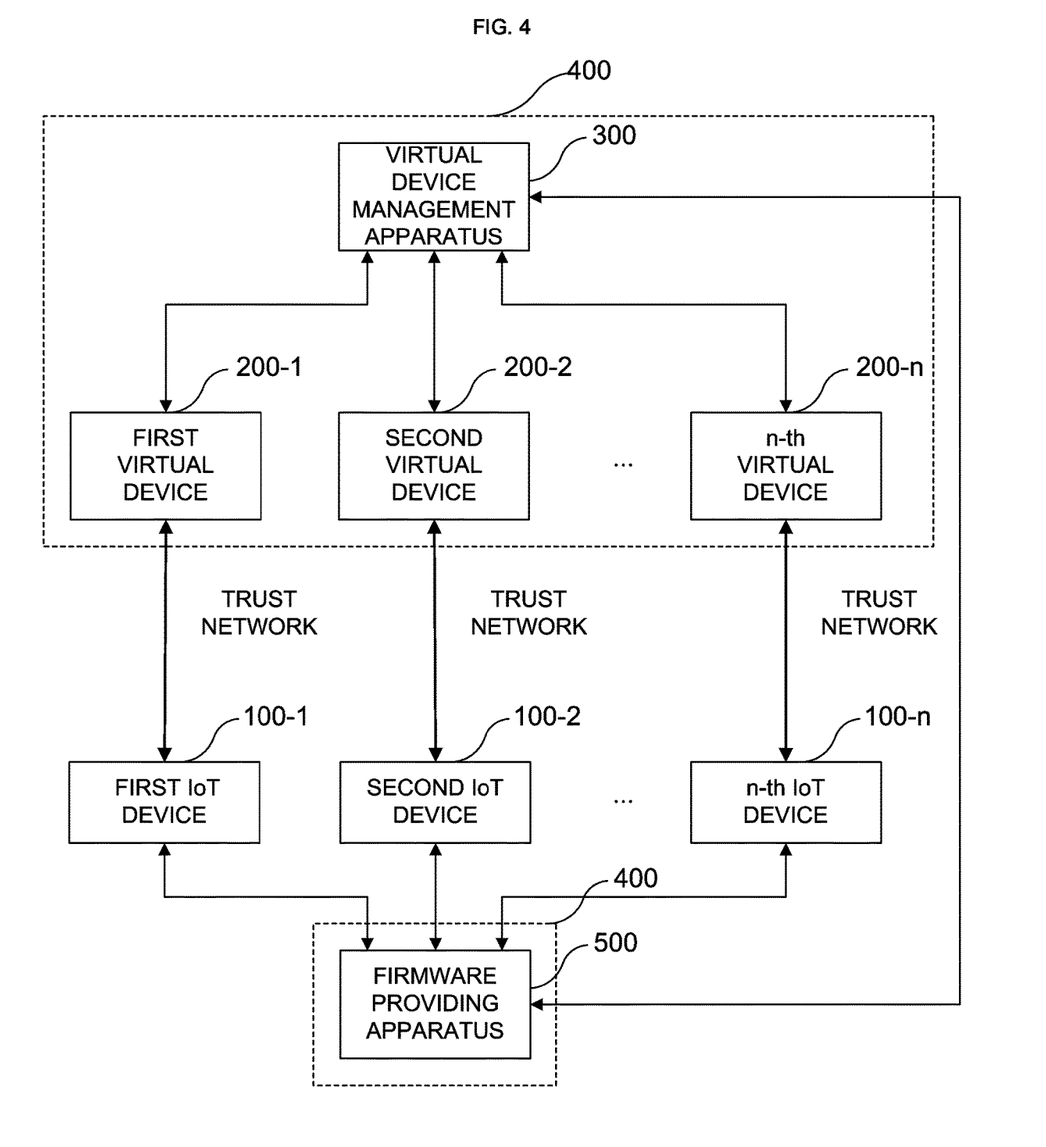
FIG. 4 is a diagram illustrating an exemplary configuration of an IoT device management system according to a second embodiment of the technique described in the present disclosure.

FIG. 4 is a diagram illustrating an exemplary configuration of an IoT device management system according to a second embodiment of the technique described in the present disclosure.

Referring to FIG. 4, the IoT device management system 400 includes a first virtual device 200-1 to an n-th virtual device 200-*n* (n is a natural number greater than or equal to 2) and a virtual device management apparatus 300.

The first virtual device 200-1 to the n-th virtual device 200-*n* may be implemented by using, for example, computing devices such as personal computers and dedicated computers. In other words, each of the first virtual device 200-1 to the n-th virtual device 200-*n* may be provided by software implementation of each of the first virtual device 200-1 to the n-th virtual device 200-*n* in the computing device.

The first virtual device 200-1 to the n-th virtual device 200-*n* are created and maintained in one-to-one correspondence with the first IoT device 100-1 to the n-th IoT device 100-*n*.

The virtual device management apparatus 300 may be implemented by using, for example, a computing device such as a personal computer and a dedicated computer.

As an example, the first virtual device 200-1 to the n-th virtual device 200-*n* and the virtual device management apparatus 300 may be implemented within the same computing device or using a plurality of computing devices distributed and connected through a network. Specifically, at least one of the first virtual device 200-1 to the n-th virtual device 200-*n* and the virtual device management apparatus 300 may be implemented within a cloud computing environment. In addition, the virtual device management apparatus 300 may be implemented using a plurality of computing devices distributed and connected through a network. Specifically, the virtual device management apparatus 300 may also be implemented within a cloud computing environment. Accordingly, it is possible to minimize the cost for implementing the IoT device management system 400.

In particular, when 'n' is a very large number, that is, when the number of the first virtual device 200-1 to the n-th virtual device 200-*n* in the IoT device management system 400 is very large, at least one of the first virtual device 200-1 to the n-th virtual device 200-*n* and the virtual device management apparatus 300 may be implemented within a cloud computing environment.

Referring to FIG. 4, the IoT device management system 400 may further include a firmware providing apparatus 500.

The firmware providing apparatus 500 is configured to store the firmware of the first IoT device 100-1 to the firmware of the n-th IoT device 100-*n*, respectively, and transmit the corresponding firmware to each of the first IoT device 100-1 to the n-th IoT device 100-*n*. The firmware providing apparatus 500 may be implemented by using, for example, a computing device such as a personal computer and a dedicated computer. Further, the firmware providing apparatus 500 may provide the firmware of the first IoT device 100-1 to the firmware of the n-th IoT device 100-*n* to the virtual device management apparatus 300, as will be described later. The firmware of the first IoT device 100-1 to the firmware of the n-th IoT device 100-*n* may be different from each other or the same as each other.

Figure 5:
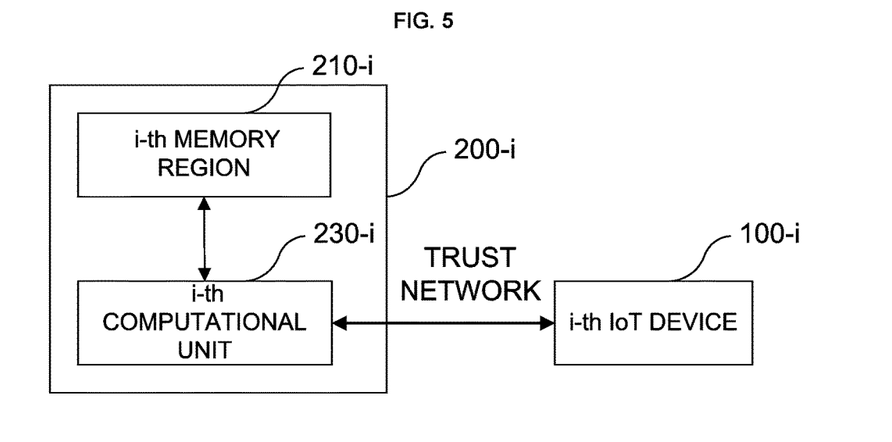
FIG. 5 is a diagram illustrating an exemplary configuration of an i-th virtual device of the IoT device management system according to the second embodiment of the technique described in the present disclosure.

FIG. 5 is a diagram illustrating an exemplary configuration of an i-th virtual device of the IoT device management system according to the second embodiment of the technique described in the present disclosure.

Referring to FIG. 5, the i-th virtual device 200-*i* among the first virtual device 200-1 to the n-th virtual devices 200-*n* includes an i-th memory region 210-*i* corresponding to the memory disposed in the normal zone of an i-th IoT device 100-*i* and an i-th computational unit 230-*i* connected to a driver disposed in the secure zone of the i-th IoT device 100-*i* through the trust network. Here, T is a natural number greater than or equal to 1 and less than or equal to 'n.'

The i-th IoT device 100-*i* has, for example, substantially the same configuration as the aforementioned IoT device 100. The memory disposed in the normal zone of the i-th IoT device 100-*i* corresponds to, for example, the first memory 110 shown in FIG. 1, and the driver disposed in the secure zone of the i-th IoT device 100-*i* corresponds to, for example, the second driver 150 shown in FIG. 1. Accordingly, a detailed description of the i-th IoT device 100-*i* will be omitted.

The i-th memory region 210-*i* is maintained to be synchronized with the memory disposed in the normal zone of the i-th IoT device 100-*i*. The i-th computational unit 230-*i* receives an initial state data of the memory disposed in the normal zone of the i-th IoT device 100-*i* through the driver disposed in the secure zone of the i-th IoT device 100-*i*. Then, the i-th computational unit 230-*i* stores the initial state data of the memory in the i-th memory region 210-*i*. Accordingly, the i-th memory region 210-*i* stores the initial state data of the memory disposed in the normal zone of the i-th IoT device 100-*i*. As a result, the i-th virtual device 200-*i* may be created. Further, as will be described later, when the i-th computational unit 230-*i* receives data change information of the memory of the i-th IoT device 100-*i*, the i-th computational unit 230-*i* applies the data change information of the memory of the i-th IoT device 100-*i* to the i-th memory region 210-*i*. Accordingly, the i-th virtual device 200-*i* may be updated according to the operation of the i-th IoT device 100-*i*.

The i-th computational unit 230-*i* may operate on, for example, an operating system (or a secure operating system). Similarly, the i-th virtual device (where T is a natural number greater than or equal to 1 and less than or equal to 'n') 200-*i* may operate in software on an operating system (or security operating system).

Figure 6:
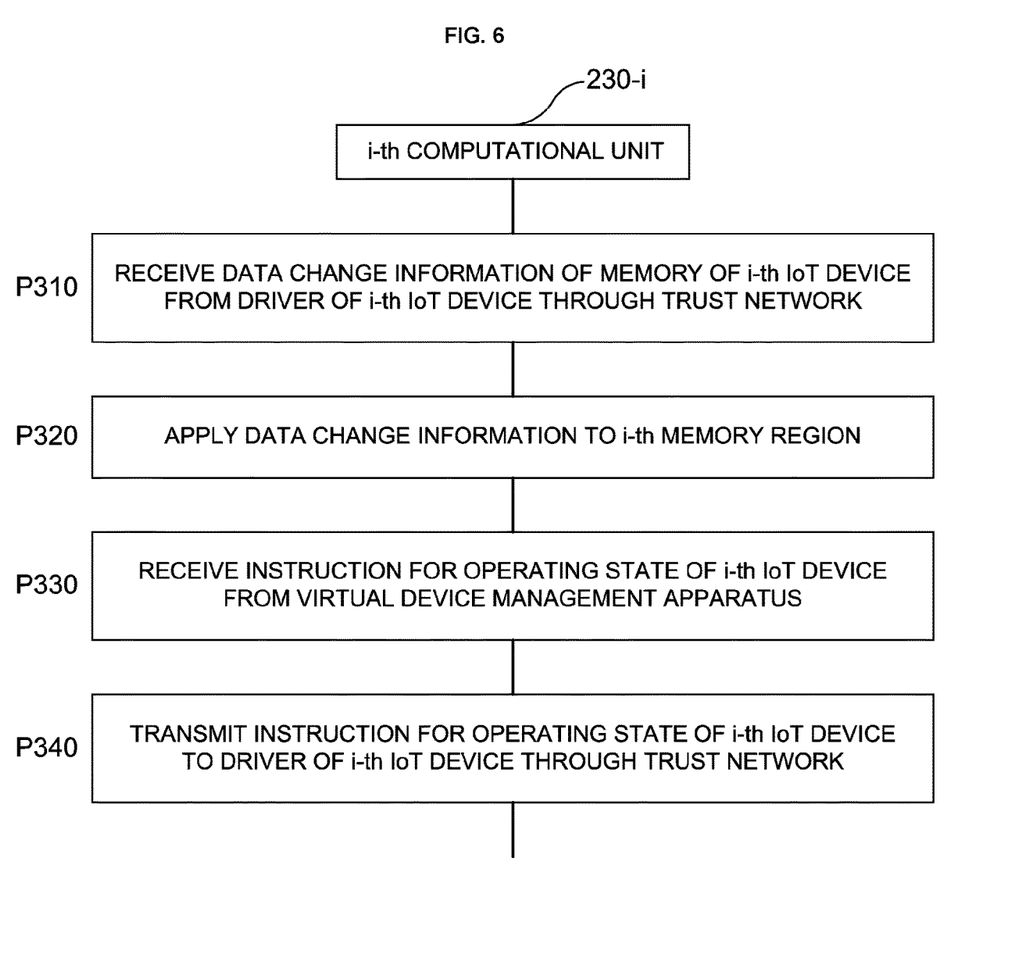
FIG. 6 is a diagram illustrating an example of processes performed by an i-th computational unit of the i-th virtual device of the IoT device management system according to the second embodiment of the technique described in the present disclosure.

FIG. 6 is a diagram illustrating an example of processes performed by the i-th computational unit of the i-th virtual device of the IoT device management system according to the second embodiment of the technique described in the present disclosure.

Referring to FIG. 6, the i-th computational unit 230-*i* receives data change information of the memory of the i-th IoT device 100-*i* from the driver of the i-th IoT device 100-*i* through the trust network (process P310).

Specifically, when the data in the memory disposed in the normal zone of the i-th IoT device 100-*i* is changed according to the operation (including both normal and abnormal operations) of the i-th IoT device 100-*i*, the i-th computational unit 230-*i* receives data change information of the memory of the i-th IoT device 100-*i* through the process P310.

Next, the i-th computational unit 230-*i* applies the data change information of the memory of the i-th IoT device 100-*i*, which is received through the process P310, to the i-th memory region 210-*i* (process P320). Based thereon, the i-th virtual device 200-*i* operates after being updated according to the operation of the i-th IoT device 100-*i*.

Next, the i-th computational unit 230-*i* receives an instruction for an operating state of the i-th IoT device 100-*i* from the virtual device management apparatus 300 (process P330).

Specifically, the i-th computational unit 230-*i* does not determine whether the i-th virtual device 200-*i* operates normally or abnormally, but receives the instruction for the operating state of the i-th IoT device 100-*i* from the virtual device management apparatus 300 through the process P330. That is, the i-th computational unit 230-*i* receives the instruction for the operating state of the i-th IoT device 100-*i* from the virtual device management apparatus 300 in order to minimize the influence on the operation of the i-th virtual device 200-*i*. If the i-th computational unit 230-*i* is configured to directly determine whether the i-th virtual device 200-*i* operates normally or abnormally, the i-th virtual device 200-*i* may have a complicated configuration.

Next, the i-th computational unit 230-*i* transmits the instruction for the operating state of the i-th IoT device 100-*i* received through the process P330 to the driver of the i-th IoT device 100-*i* through the trust network (process P340).

Specifically, the i-th computational unit 230-*i* transmits the instruction for the operating state of the i-th IoT device 100-*i* to the driver disposed in the secure zone of the i-th IoT device 100-*i* through the process P340 to thereby control an operating state of the IoT device 100-*i*. For example, when the i-th IoT device 100-*i* is exposed to a malicious attack such as a hacking attack, the i-th IoT device 100-*i* may effectively respond to the malicious attack by controlling the operating state of the i-th IoT device 100 based on the instruction for the operating state of the i-th IoT device 100-I received from the i-th computational unit 230-*i*.

Hereinafter, an operation of the virtual device management apparatus 300 will be described.

Figure 7:
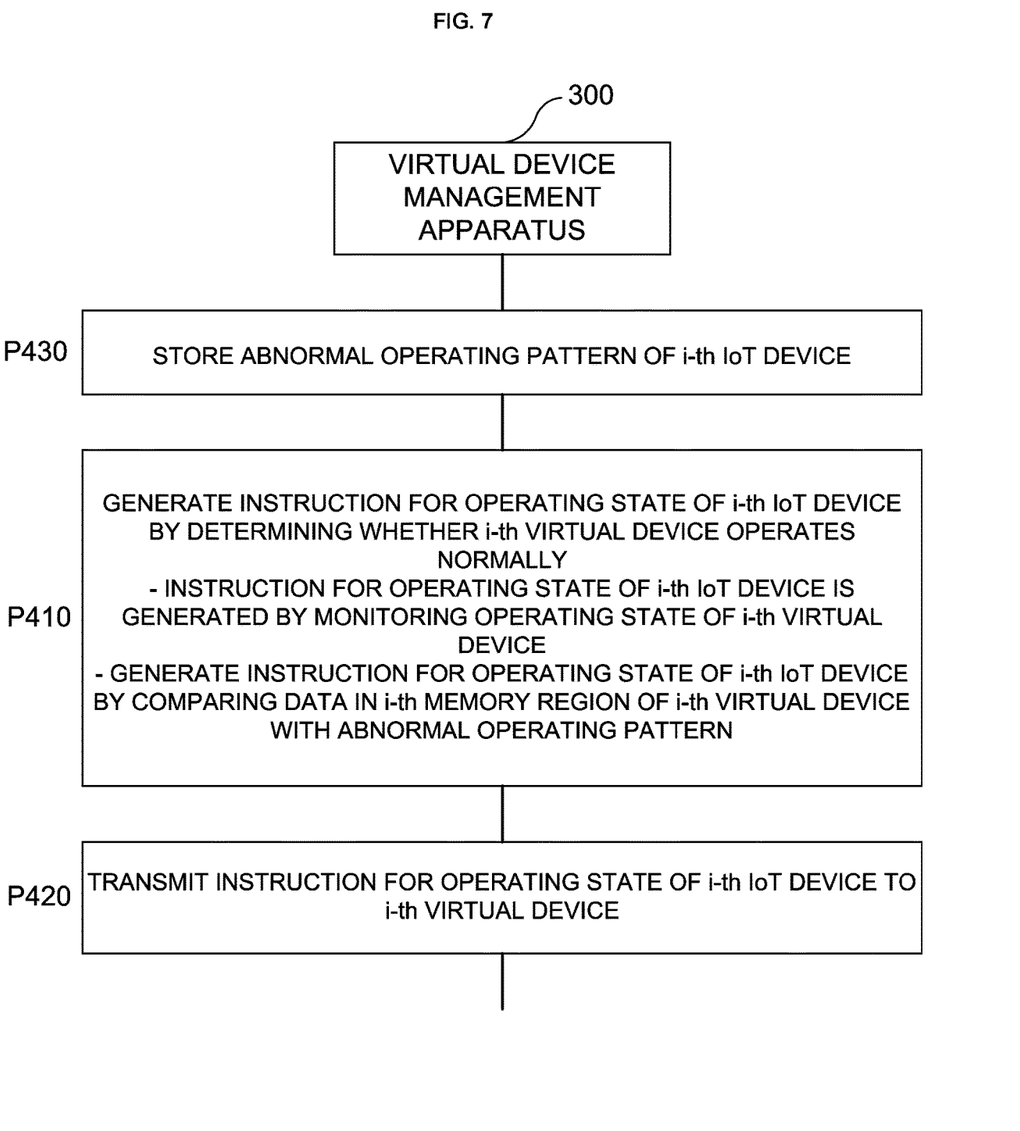
FIG. 7 is a diagram illustrating an example of processes performed by a virtual device management apparatus of the IoT device management system according to the second embodiment of the technique described in the present disclosure.

FIG. 7 is a diagram illustrating an example of processes performed by the virtual device management apparatus of the IoT device management system according to the second embodiment of the technique described in the present disclosure.

Referring to FIG. 7, the virtual device management apparatus 300 generates the instruction for the operating state of the i-th IoT device 100-*i* by determining whether the i-th virtual device 200-*i* operates normally or abnormally (process P410).

As described above, in order to minimize the influence on the operation of the i-th virtual device 200-*i*, the virtual device management apparatus 300 determines whether the i-th virtualization device 200-*i* operates normally or abnormally.

The process P410 may include a process of generating an instruction for the operating state of the i-th IoT device 100-*i* by monitoring the operating state of the i-th virtual device 200-*i*. For example, when it is determined that the i-th virtual device 200-*i* operates normally, the i-th virtual device 200-*i* generates a first instruction for the operating state that allows the i-th IoT device 100-*i* to continue its operation. As another example, when it is determined that the i-th virtual device 200-*i* does not operate normally for a certain period of time or it is determined that a malicious attack such as a hacking attack is suspected, the i-th virtual device 200-*i* generates either a second instruction for the operating state for stopping the operation of the i-th IoT device 100-*i* or a third instruction for the operating state for rebooting and initializing the i-th IoT device 100-*i*.

The second instruction for the operating state may be generated, for example, when it is necessary to stop the operation of the i-th IoT device 100-*i* for more accurate determination, and the third instruction for the operating state may be generated, for example, when the immediate respond to the malicious attack is necessary.

Next, the virtual device management apparatus 300 transmits the instruction for the operating state of the i-th IoT device 100-*i* generated through the process P410 to the i-th virtual device 200-*i* (process P420).

As described above, the i-th computational unit 230-*i* of the i-th virtual device 200-*i* may transmit the instruction for the operating state of the i-th IoT device 100-*i* to the driver of the i-th IoT device 100-*i* through the trust network.

The virtual device management apparatus 300 may store an abnormal operating pattern of the i-th IoT device 100-*i* (process P430). The abnormal operating pattern of the i-th IoT device 100-*i* refers to, for example, data generated when the i-th IoT device 100-*i* operates abnormally (including a case where the i-th IoT device 100-*i* operates abnormally due to a malicious attack). In a case when the virtual device management apparatus 300 stores the abnormal operating pattern of the i-th IoT device 100-*i* in a memory included therein, the process P410 may include a process of generating an instruction for the operating state of the i-th IoT device 100-*i* by comparing the data in the i-th memory region 210-*i* of the i-th virtual device 200-*i* with the abnormal operating pattern.

Figure 8:
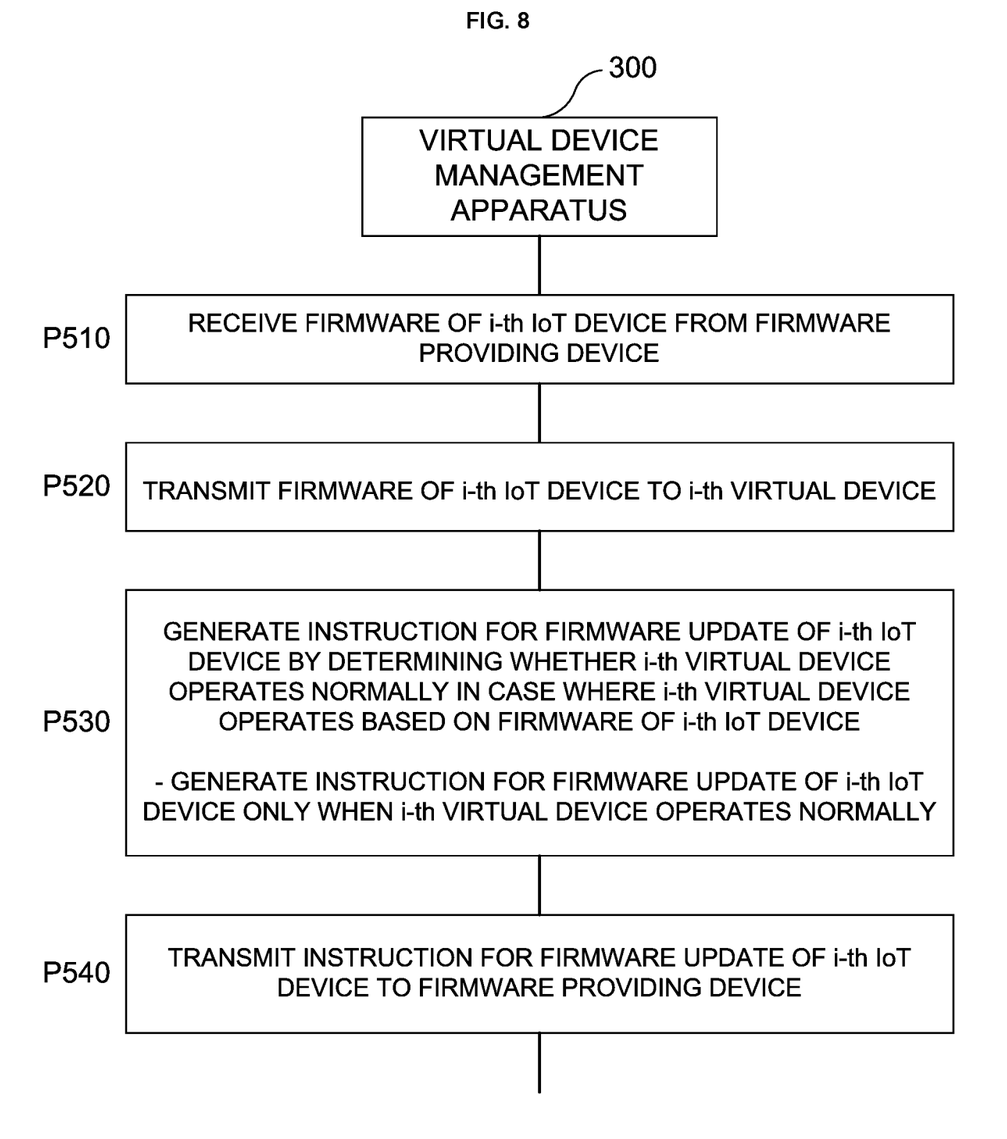
FIG. 8 is a diagram illustrating another example of processes performed by the virtual device management apparatus of the IoT device management system according to the second embodiment of the technique described in the present disclosure.

FIG. 8 is a diagram illustrating another example of processes performed by the virtual device management apparatus of the IoT device management system according to the second embodiment of the technique described in the present disclosure.

Referring to FIG. 8, the virtual device management apparatus 300 receives the firmware of the i-th IoT device 100-$i$ from the firmware providing device 500 (process P510).

As described above, the firmware providing device 500 is a device that stores the firmware of the first IoT device 100-1 to the firmware of the n-th IoT device 100-$n$, respectively, and transmit the corresponding firmware to each of the first IoT device 100-1 to the n-th IoT device 100-$n$. In the description with reference to FIG. 8, it is assumed that the firmware of the first IoT device 100-1 to the firmware of the n-th IoT device 100-$n$ are different from each other.

Next, the virtual device management apparatus 300 transmits the firmware of the i-th IoT device 100-$i$ to the i-th virtual device 200-$i$ (process P520). When the i-th virtual device 200-$i$ receives the firmware of the i-th IoT device 100-$i$, the i-th virtual device 200-$i$ operates based on the firmware of the i-th IoT device 100-$i$. That is, in the i-th virtual device 200-$i$, the i-th memory region 210-$i$ is updated based on the firmware of the i-th IoT device 100-$i$, so that the i-th virtual device 200-$i$ operates based on the firmware of the i-th IoT device 100-$i$.

Next, in the case when the i-th virtual device 200-$i$ operates based on the firmware of the i-th IoT device 100-$i$, the virtual device management apparatus 300 generates an instruction for a firmware update (firmware update instruction) of the i-th IoT device 100-$i$ by determining whether the i-th virtual device 200-$i$ operates normally (process P530). For example, the description of determining whether the i-th virtual device 200-$i$ operates normally is omitted since it is performed in the same manner that described in the process P410.

Preferably, only when the i-th virtual device 200-$i$ operates normally while the i-th virtual device 200-$i$ operates based on the firmware of the i-th IoT device 100-$i$, the virtual device management apparatus 300 may generate the instruction for the firmware update of the i-th IoT device 100-$i$ and transmit the corresponding firmware update instruction to the firmware providing device 500.

Next, the virtual device management apparatus 300 transmits the instruction for the firmware update of the i-th IoT device 100-$i$ to the firmware providing device 500 (process P540).

The firmware providing device 500 transmits the firmware of the i-th IoT device 100-$i$ to the i-th IoT device 100-$i$ only when receiving the instruction for the firmware update of the i-th IoT device 100-$i$ from the virtual device management apparatus 300.

In the case where the i-th virtual device 200-$i$ operates based on the firmware of the i-th IoT device 100-$i$, the firmware providing device 500 may transmit the firmware of the i-th IoT device 100-$i$ to the i-th IoT device 100-$i$ after confirming in advance through the virtual device management apparatus 300 whether the i-th virtual device 200-$i$ operates normally. Accordingly, it is possible to minimize the possibility of errors that may occur in the process of updating the firmware of the i-th IoT device 100-$i$.

Figure 9:
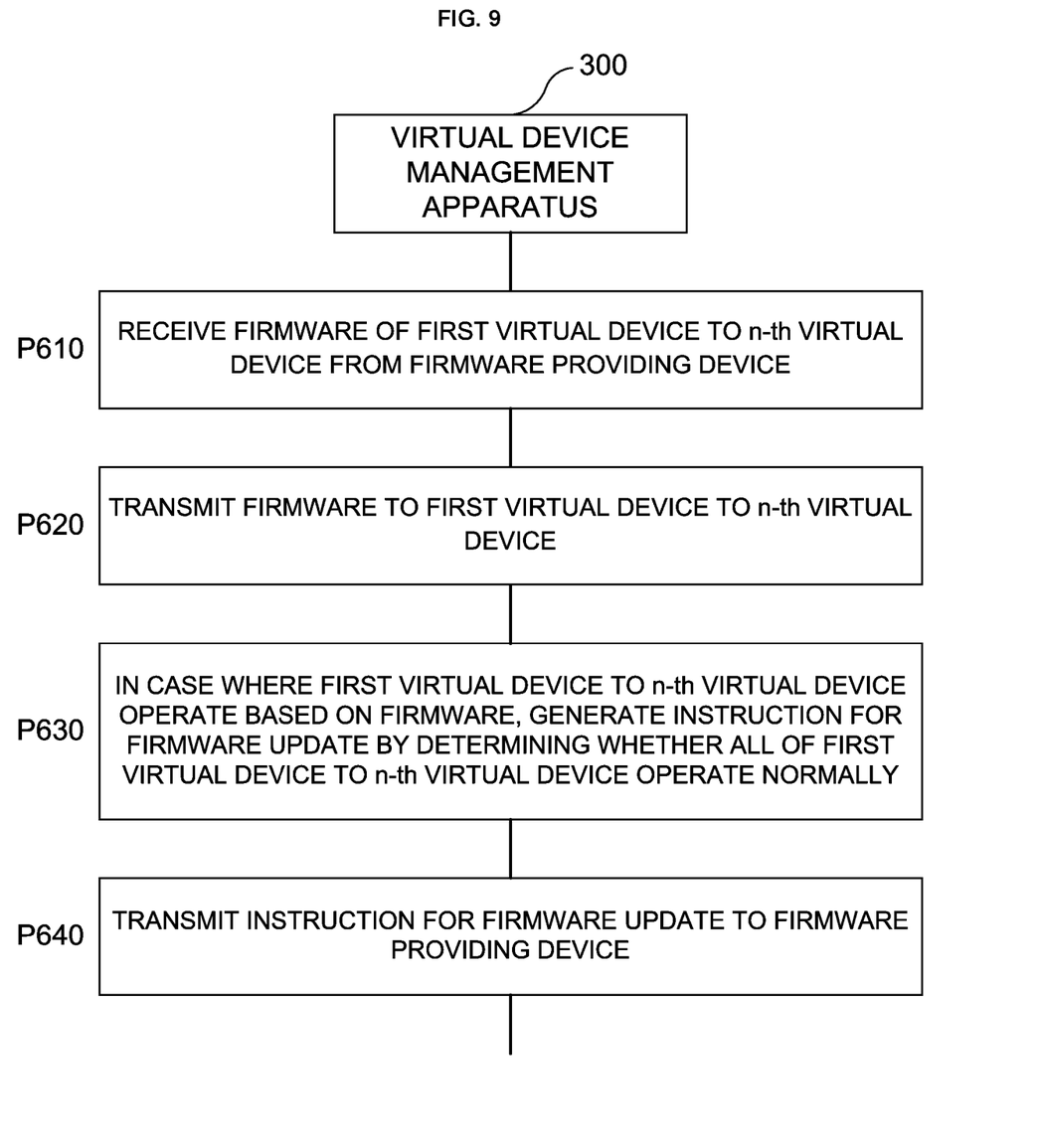
FIG. 9 is a diagram illustrating still another example of processes performed by the virtual device management apparatus of the IoT device management system according to the second embodiment of the technique described in the present disclosure.

FIG. 9 is a diagram illustrating still another example of processes performed by the virtual device management apparatus of the IoT device management system according to the second embodiment of the technique described in the present disclosure.

Since the processes illustrated in FIG. 9 are similar to the processes illustrated in FIG. 8, the differences therebetween will be mainly described.

Referring to FIG. 9, the virtual device management apparatus 300 receives the firmware from the firmware providing device 500 (process P610). In the description with reference to FIG. 9, it is assumed that the firmware of the first IoT device 100-1 to the firmware of the n-th IoT device 100-$n$ are the same as each other.

Next, the virtual device management apparatus 300 transmits the firmware to the first virtual device 200-1 to the n-th virtual device 200-$n$ (process P620).

Next, in the case where the first virtual device 200-1 to the n-th virtual device 200-$n$ operate based on the firmware transmitted through the process P620, the virtual device management apparatus 300 generates the firmware update instruction by determining whether the first virtual device 200-1 to the n-th virtual device 200-$n$ operate normally (process P630).

Preferably, only when all of the first virtual device 200-1 to the n-th virtual device 200-$n$ operate normally while the first virtual device 200-1 to the n-th virtual device 200-$n$ operate based on the same firmware, the virtual device management apparatus 300 may generate the firmware update instruction and transmit the corresponding firmware update instruction to the firmware providing device 500.

Next, the virtual device management apparatus 300 transmits the firmware update instruction generated through the process P630 to the firmware providing device 500 (process P640).

The firmware providing device 500 transmits the firmware to the first virtual device 200-1 to the n-th virtual device 200-$n$ only when receiving the firmware update instruction from the virtual device management apparatus 300.

Accordingly, in the case where the first virtual device 200-1 to the n-th virtual device 200-$n$ operate based on the same firmware, the firmware providing device 500 may transmit the firmware to the first IoT device 100-1 to the n-th IoT device 100-$n$ after confirming in advance through the virtual device management apparatus 300 whether all of the first virtual device 200-1 to the n-th virtual device 200-$n$ operate normally. Therefore, it is possible to minimize the possibility of errors that may occur in the process of updating the firmware of the first IoT device 100-1 to the n-th IoT device 100-$n$.

According to the second embodiment, for example, the IoT device management system having high computing power determines whether a virtual device, which is a virtualized device obtained by virtualizing the IoT device, operates normally and generates an instruction for the operating state to effectively respond to the malicious attacks such as the hacking attack.

Other Embodiments

Although the embodiments of the technique described in the present disclosure have been described in detail, the presently disclosed embodiments are considered in all respects to be illustrative and not restrictive. Further, for those of ordinary skill in the art to which the technique described in the present disclosure pertains, the above-described embodiments may be omitted, replaced, or changed in various forms without departing from the scope of the technique described in the present disclosure.

For example, the features of the IoT device and the IoT device management system according to the technique described in the present disclosure may be applied to a method for managing the IoT device.

In accordance with an aspect of the technique described in the present disclosure, there is provided a method for managing an Internet of Things (IoT) device provided with a first memory disposed in a normal zone, a first driver disposed in the normal zone; and a second driver disposed in a secure zone, the method including: (a) generating, by the first driver, data change information of the first memory by monitoring the first memory, the data change information being information on changes of data in the first memory; (b) transmitting, by the first driver, the data change information to the second driver; (c) transmitting, by the second driver, the data change information to a specified IoT device management system; (d) receiving, by the second driver, an instruction for an operating state from the IoT device management system and transmitting, by the second driver, the instruction for the operating state to the first driver; and (e) controlling, by the first driver, an operating state of the IoT device based on the instruction for the operating state received by the second driver. Since the method for managing the IoT device performed by the IoT device is substantially the same as the method that is performed by the IoT device of the first embodiment described above, a description thereof will be omitted.

Further, in accordance with another aspect of the technique described in the present disclosure, there is provided a method for managing an Internet of Things (IoT) to be performed by an IoT device management system provided with a first virtual device to an n-th virtual device where 'n' is a natural number greater than or equal to 2 and a virtual device management apparatus, wherein an i-th virtual device (where T is a natural number greater than or equal to 1 and less than or equal to 'n') among the first virtual device to the n-th virtual device includes an i-th memory region corresponding to a memory disposed in a normal zone of an i-th IoT device, and an i-th computational unit connected to a driver disposed in a secure zone of the i-th IoT device through a trust network, the method including: (a) receiving, by the i-th computational unit, data change information of the memory of the i-th IoT device from the driver of the i-th IoT device through the trust network, the data change information being information on changes of data in the first memory; (b) applying, by the i-th computational unit, the data change information to the i-th memory region; (c) generating, by the virtual device management apparatus, an instruction for an operating state of the i-th IoT device by determining whether the i-th virtual device operates normally; (d) transmitting, by the virtual device management apparatus, the instruction for the operating state of the i-th IoT device to the i-th virtual device; (e) receiving, by the i-th computational unit, the instruction for the operating state of the i-th IoT device from the virtual device management apparatus; and (f) transmitting, by the i-th computational unit, the instruction for the operating state of the i-th IoT device to the driver of the i-th IoT device through the trust network. Since the method for managing the IoT device performed by the IoT device management system is substantially the same as the method performed by the IoT device management system of the second embodiment described above, a description thereof will be omitted.

Other features of the IoT device and the IoT device management system according to the technique described in the present disclosure may also be applied into the exemplary configurations of the method for managing the IoT device according to the technique described in the present disclosure.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

In accordance with the technique described in the present disclosure, it is possible to provide an Internet of Things (IoT) device capable of effectively responding to malicious attacks, and also to provide an IoT device management system capable of managing an operation of the IoT device by analyzing the malicious attacks on the IoT device and a method for managing the IoT device.

In accordance with the technique described in the present disclosure, for example, even when the IoT device is implemented by using a semiconductor device such as a low specification processor, the effective response to the malicious attacks can be made by controlling an operating state of the IoT device based on an instruction for an operating state transmitted from the IoT device management system.

In accordance with the technique described in the present disclosure, for example, the IoT device management system having high computing power determines whether a virtual device of the IoT device operates normally to thereby generate an instruction for an operating state. Therefore, the effective response to the malicious attacks can be made.

What is claimed is:
1. An Internet of Things (IoT) device comprising:
   a first memory disposed in a normal zone;
   a first driver disposed in the normal zone; and
   a second driver disposed in a secure zone,
   wherein the first driver is configured to perform:
   (a) monitoring the first memory to generate data change information of the first memory, the data change information being information on changes of data in the first memory;
   (b) transmitting the data change information to the second driver; and
   (c) controlling an operating state of the IoT device based on an instruction for the operating state received from the second driver,
   wherein the second driver is configured to perform:
   (d) transmitting the data change information to a specified IoT device management system; and
   (e) receiving the instruction for the operating state from the specified IoT device management system and transmitting the instruction for the operating state to the first driver.

2. The IoT device of claim 1, wherein the specified IoT device management system applies the data change information to a virtual device of the IoT device and determines whether the virtual device operates normally to thereby generate the instruction for the operating state.

3. The IoT device of claim 1, further comprising:
   a second memory disposed in the secure zone and storing the data change information,
   wherein the second driver is further configured to perform:
   (f), before (d), receiving the data change information and storing the received data change information in the second memory, and wherein (d) comprises: (d-1) reading the data change information from the second memory.

4. The IoT device of claim 1, wherein the instruction for the operating state includes a first instruction for the operating state that allows the IoT device to continue an operation, a second instruction for the operating state that stops the operation of the IoT device, and a third instruction for the operating state that reboots and initializes the IoT device, and
wherein in (c) comprises:
(c-1) continuing the operation of the IoT device according to the first instruction for the operating state;
(c-2) stopping the operation of the IoT device according to the second instruction for the operating state; and
(c-3) rebooting and initializing the IoT device according to the third instruction for the operating state.

5. The IoT device of claim 4, further comprising:
a third memory disposed in the secure zone and storing an initial state data of the first memory,
wherein (c-3) comprises:
(c-4) receiving the initial state data from the third memory through the second driver; and
(c-5) rebooting and initializing the IoT device based on the initial state data.

6. The IoT device of claim 1, wherein the secure zone is provided with a third memory that stores an initial state data of the first memory, and
wherein the second driver is further configured to perform:
(g) transmitting the initial state data to the the specified IoT device management system.

7. The IoT device of claim 1, wherein the data change information includes data in the first memory that is changed according to an operation of the IoT device and a storage location of the changed data.

8. The IoT device of claim 1, wherein the second driver transmits the data change information to the specified IoT device management system through a trust network and receives the instruction for the operating state from the IoT device management system.

9. An Internet of Things (IoT) device management system comprising:
a first virtual device to an n-th virtual device where 'n' is a natural number greater than or equal to 2; and
a virtual device management apparatus,
wherein an i-th virtual device (where T is a natural number greater than or equal to 1 and less than or equal to 'n') among the first virtual device to the n-th virtual device includes:
an i-th memory region corresponding to a memory disposed in a normal zone of an i-th IoT device; and
an i-th computational unit connected to a driver disposed in a secure zone of the i-th IoT device through a trust network,
wherein the i-th computational unit is configured to perform:
(a) receiving data change information of the memory of the i-th IoT device from the driver of the i-th IoT device through the trust network, the data change information being information on changes of data in the first memory;
(b) applying the data change information to the i-th memory region;
(c) receiving an instruction for an operating state of the i-th IoT device from the virtual device management apparatus; and (d) transmitting the instruction for the operating state of the i-th IoT device to the driver of the i-th IoT device through the trust network, and
wherein the virtual device management apparatus is configured to perform:
(e) generating the instruction for the operating state of the i-th IoT device by determining whether the i-th virtual device operates normally; and
(f) transmitting the instruction for the operating state of the i-th IoT device to the i-th virtual device.

10. The IoT device management system of claim 9, wherein at least one of the first virtual device to the n-th virtual device and the virtual device management apparatus is implemented within a cloud computing environment.

11. The IoT device management system of claim 9, wherein (e) comprises: (e-1) generating the instruction for the operating state of the i-th IoT device by monitoring the operating state of the i-th virtual device.

12. The IoT device management system of claim 9, wherein the virtual device management apparatus is further configured to perform:
(g) storing an abnormal operating pattern of the i-th IoT device, and
wherein (e) comprises: (e-2) generating the instruction for the operating state of the i-th IoT device by comparing the abnormal operating pattern with data in the i-th memory region of the i-th virtual device.

13. The IoT device management system of claim 9, further comprising:
a firmware providing device that stores a firmware of the i-th IoT device and transmits the firmware of the i-th IoT device to the i-th IoT device,
wherein the virtual device management apparatus is further configured to perform:
(g) receiving the firmware of the i-th IoT device from the firmware providing device;
(h) transmitting the firmware of the i-th IoT device to the i-th virtual device;
(i) when the i-th virtual device operates based on the firmware of the i-th IoT device, generating an instruction for a firmware update of the i-th IoT device by determining whether the i-th virtual device operates normally; and
(j) transmitting the instruction for the firmware update of the i-th IoT device to the firmware providing device, and
wherein the firmware providing device transmits the firmware of the i-th IoT device to the i-th IoT device only when receiving the instruction for the firmware update of the i-th IoT device from the virtual device management apparatus.

14. The IoT device management system of claim 13, wherein (i) comprises (i-1) generating the instruction for the firmware update of the i-th IoT device only when the i-th virtual device operates normally.

15. The IoT device management system of claim 9, further comprising:
a firmware providing device that stores a firmware of the first virtual device to the n-th virtual device and transmits the firmware to each of the first virtual device to the n-th virtual device,
wherein the virtual device management apparatus is further configured to perform:
(k) receiving the firmware from the firmware providing device;
(l) transmitting the firmware to each of the first virtual device to the n-th virtual device;

(m) when the first virtual device to the n-th virtual device operate based on the firmware, generating an instruction for a firmware update by determining whether all of the first virtual device to the n-th virtual device operate normally; and (n) transmitting the instruction for the firmware update to the firmware providing device, and wherein the firmware providing device transmits the firmware to each of the first virtual device to the n-th virtual device only when receiving the instruction for the firmware update from the virtual device management apparatus.

16. The IoT device management system of claim 15, wherein (m) comprises (m-1) generating the instruction for the firmware update only when all of the first virtual device to the n-th virtual device operate normally.

17. A method for managing an Internet of Things (IoT) device provided with a first memory disposed in a normal zone, a first driver disposed in the normal zone, and a second driver disposed in a secure zone, the method comprising:
  (a) generating, by the first driver, data change information of the first memory by monitoring the first memory, the data change information being information on changes of data in the first memory;
  (b) transmitting, by the first driver, the data change information to the second driver;
  (c) transmitting, by the second driver, the data change information to a specified IoT device management system;
  (d) receiving, by the second driver, an instruction for an operating state from the specified IoT device management system and transmitting, by the second driver, the instruction for the operating state to the first driver; and
  (e) controlling, by the first driver, an operating state of the IoT device based on the instruction for the operating state received by the second driver.

18. A method for managing an Internet of Things (IoT) to be performed by an IoT device management system provided with a first virtual device to an n-th virtual device where 'n' is a natural number greater than or equal to 2 and a virtual device management apparatus, wherein an i-th virtual device (where T is a natural number greater than or equal to 1 and less than or equal to 'n') among the first virtual device to the n-th virtual device includes an i-th memory region corresponding to a memory disposed in a normal zone of an i-th IoT device and an i-th computational unit connected to a driver disposed in a secure zone of the i-th IoT device through a trust network, the method comprising:
  (a) receiving, by the i-th computational unit, data change information of the memory of the i-th IoT device from the driver of the i-th IoT device through the trust network, the data change information being information on changes of data in the first memory;
  (b) applying, by the i-th computational unit, the data change information to the i-th memory region;
  (c) generating, by the virtual device management apparatus, an instruction for an operating state of the i-th IoT device by determining whether the i-th virtual device operates normally;
  (d) transmitting, by the virtual device management apparatus, the instruction for the operating state of the i-th IoT device to the i-th virtual device;
  (e) receiving, by the i-th computational unit, the instruction for the operating state of the i-th IoT device from the virtual device management apparatus; and
  (f) transmitting, by the i-th computational unit, the instruction for the operating state of the i-th IoT device to the driver of the i-th IoT device through the trust network.

* * * * *